US012795163B2

(12) United States Patent
Eguchi

(10) Patent No.: US 12,795,163 B2
(45) Date of Patent: Nov. 10, 2026

(54) IMAGE PROCESSING APPARATUS AND IMAGE PROCESSING METHOD

(71) Applicant: CANON KABUSHIKI KAISHA, Tokyo (JP)

(72) Inventor: Yosuke Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/059,778

(22) Filed: Feb. 21, 2025

(65) Prior Publication Data

US 2025/0193449 A1 Jun. 12, 2025

Related U.S. Application Data

(63) Continuation of application No. PCT/JP2023/031637, filed on Aug. 30, 2023.

(30) Foreign Application Priority Data

Sep. 6, 2022 (JP) ................................ 2022-141517

(51) Int. Cl.
*H04N 19/597* (2014.01)
*H04N 19/503* (2014.01)

(52) U.S. Cl.
CPC ......... *H04N 19/597* (2014.11); *H04N 19/503* (2014.11)

(58) Field of Classification Search
CPC .......................... H04N 19/597; H04N 19/503
See application file for complete search history.

(56) References Cited

U.S. PATENT DOCUMENTS

| | | | | |
|---|---|---|---|---|
| 4,965,840 | A | 10/1990 | Subbarao | |
| 2013/0136176 | A1* | 5/2013 | Chen | H04N 13/10 375/240.12 |
| 2013/0235152 | A1* | 9/2013 | Hannuksela | H04N 19/114 348/43 |
| 2017/0132833 | A1* | 5/2017 | Sathe | G06T 15/04 |
| 2020/0380775 | A1 | 12/2020 | Araki et al. | |
| 2020/0410752 | A1 | 12/2020 | Jiang et al. | |

FOREIGN PATENT DOCUMENTS

| | | | |
|---|---|---|---|
| JP | 2008-187385 | A | 8/2008 |
| JP | 2010-177741 | A | 8/2010 |
| JP | 2017-103564 | A | 6/2017 |
| WO | 2019/107181 | A1 | 6/2019 |

OTHER PUBLICATIONS

Nov. 14, 2023 International Search Report in International Patent Appln. PCT/JP2023/031637.

* cited by examiner

*Primary Examiner* — Jonathan R Messmore
(74) *Attorney, Agent, or Firm* — Venable LLP

(57) ABSTRACT

Disclosed is an image processing apparatus that reduces the data amount of a 3D video by use of the corrections between frames. The image processing apparatus obtains 3D video data each frame of which includes 3D data and texture information. The apparatus performs encodes the 3D video data by separately performing inter-frame prediction encoding of the 3D data and inter-frame prediction encoding of the texture information. The apparatus, based on metadata of each frame, separately selects a key frame for performing the inter-frame prediction encoding of the 3D data and a key frame for performing the inter-frame prediction encoding of the texture information.

11 Claims, 9 Drawing Sheets

IMAGE PROCESSING APPARATUS AND IMAGE PROCESSING METHOD

CROSS-REFERENCE TO RELATED APPLICATIONS

This application is a Continuation of International Patent Application No. PCT/JP2023/031637, filed Aug. 30, 2023, which claims the benefit of priority from Japanese Patent Application No. 2022-141517 filed Sep. 6, 2022, both of which are hereby incorporated by reference herein in their entirety.

BACKGROUND

Field of the Disclosure

The present disclosure relates to an image processing apparatus and an image processing method, and especially to a technique to reduce a data amount.

Background Art

A capture apparatus capable of capturing a two-dimensional (2D) video and a three-dimensional (3D) video has been known. According to Japanese Patent Laid-Open No. 2008-187385, a data amount is reduced by encoding a 3D video with use of a method conforming to the MPEG-2 standard.

In order to suppress degradation of the image quality while efficiently reducing a data amount of a 3D video with use of encoding that makes use of the correlation between frames, such as the MPEG standards, it is necessary to appropriately set a reference frame (key frame). Although PTL 1 discloses the execution of exposure control at a timing of an I-frame, it does not mention how the I-frame is set.

SUMMARY

In one embodiment of the disclosure provides an image processing apparatus and an image processing method capable of appropriately reducing a data amount of a 3D video by making use of the correlation between frames.

According to an aspect of the present disclosure, there is provided an image processing apparatus comprising: one or more processors that execute a program stored in a memory and thereby function as: an obtaining unit configured to obtain 3D video data each frame of which includes 3D data and texture information; and an encoding unit configured to encode the 3D video data with use of inter-frame prediction, wherein the encoding unit performs inter-frame prediction encoding of the 3D data and inter-frame prediction encoding of the texture information separately, and based on metadata of each frame, selects a key frame for performing the inter-frame prediction encoding of the 3D data, and a key frame for performing the inter-frame prediction encoding of the texture information, separately.

According to another aspect of the present disclosure, there is provided an image capturing apparatus, comprising: one or more processors that execute a program stored in a memory and thereby function as: an image capturing unit that generates a parallax image pair through a single capture session; a generating unit configured to generate 3D video data based on a video captured by the image capturing unit, each frame of the 3D video data including 3D data and texture information; and an image processing apparatus, wherein the image processing apparatus comprises: an encoding unit configured to encode the 3D video data with use of inter-frame prediction, wherein the encoding unit performs inter-frame prediction encoding of the 3D data and inter-frame prediction encoding of the texture information separately, and based on metadata of each frame, selects a key frame for performing the inter-frame prediction encoding of the 3D data, and a key frame for performing the inter-frame prediction encoding of the texture information, separately.

According to a further aspect of the present disclosure, there is provided an image processing method, comprising: obtaining 3D video data each frame of which includes 3D data and texture information; and encoding the 3D video data with use of inter-frame prediction, wherein the encoding includes performing inter-frame prediction encoding of the 3D data and performing inter-frame prediction encoding of the texture information separately, and selecting, based on metadata of each frame, a key frame for performing the inter-frame prediction encoding of the 3D data, and a key frame for performing the inter-frame prediction encoding of the texture information, separately.

According to another aspect of the present disclosure, there is provided a non-transitory computer-readable medium storing a program for causing a computer to perform an image processing method comprising: obtaining 3D video data each frame of which includes 3D data and texture information; and encoding the 3D video data with use of inter-frame prediction, wherein the encoding includes performing inter-frame prediction encoding of the 3D data and performing inter-frame prediction encoding of the texture information separately, and selecting, based on metadata of each frame, a key frame for performing the inter-frame prediction encoding of the 3D data, and a key frame for performing the inter-frame prediction encoding of the texture information, separately.

Further features of the present disclosure will become apparent from the following description of exemplary embodiments with reference to the attached drawings. Note that the same reference numerals denote the same or like components throughout the drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

DESCRIPTION OF THE EMBODIMENTS

First Embodiment

Figure 1:
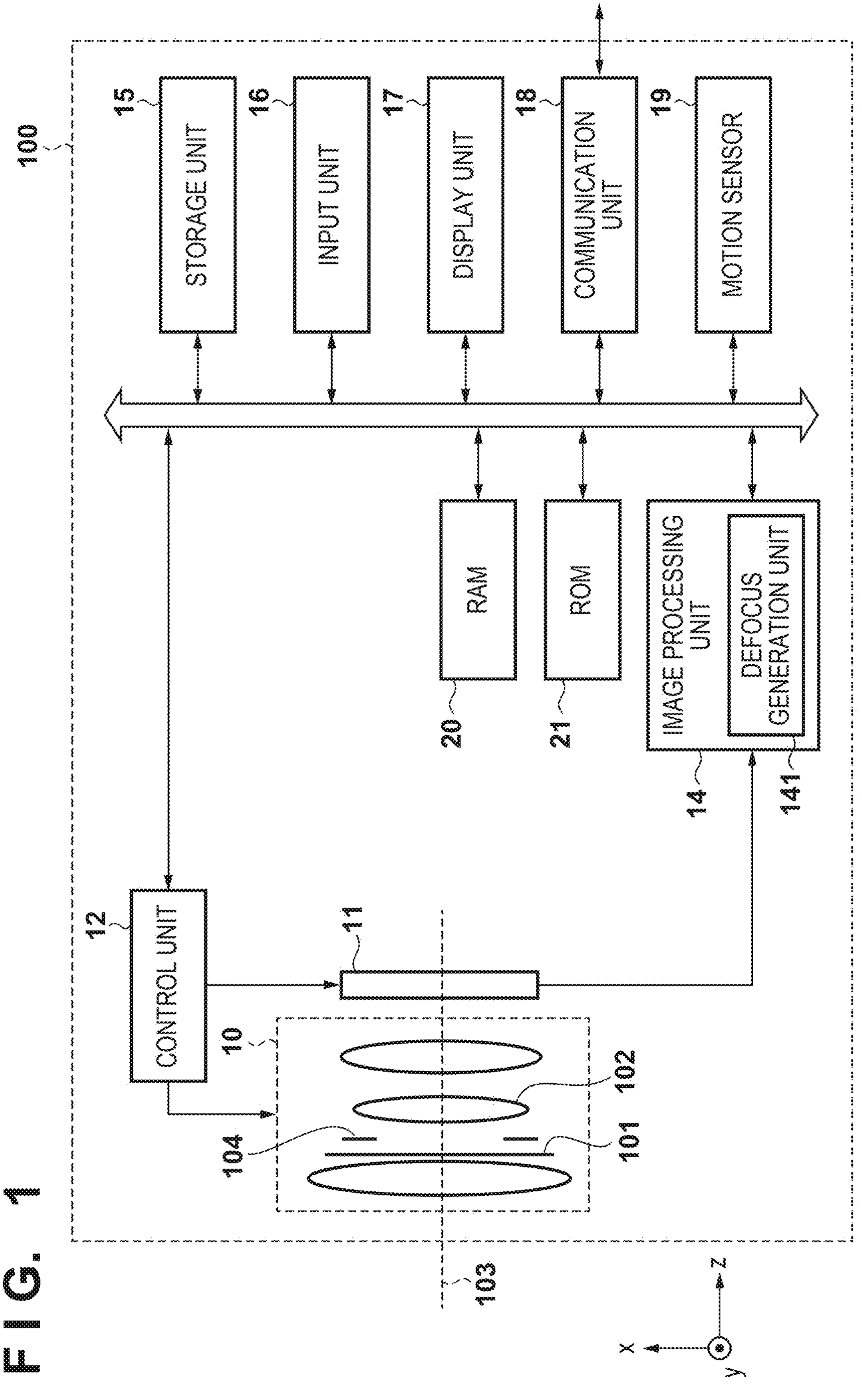
FIG. 1 is a block diagram showing an exemplary functional configuration of a digital camera as an example of an image processing apparatus according to an embodiment.

The following describes exemplary embodiments of the disclosure in detail with reference to the attached drawings. Note that the following embodiments do not limit the scope of the disclosure. Also, although the embodiments describe a plurality of features, all of them are not necessarily indispensable for the embodiments, and furthermore, the plurality of features may be combined arbitrarily. Moreover, the same or similar constituents are given the same reference numeral in the attached drawings, and duplicate explanations are omitted.

Note that the following embodiments will be described in relation to a case where the embodiment is implemented on a digital camera. However, an image capturing function is not indispensable for the embodiment, and the embodiment can be implemented on any electronic devices capable of handling image data. Such electronic devices include a video camera, a computer device (a personal computer, a tablet computer, a media player, a PDA, and the like), a mobile telephone device, a smartphone, a game device, a robot, a drone, and the like. These are examples, and the embodiment can also be implemented on other electronic devices.

<Captured Image Information>

FIG. 1 is a block diagram showing an exemplary functional configuration of a digital camera 100 as an image processing apparatus according to an embodiment.

An imaging optical system 10 forms an optical image of a subject on an image plane of an image sensor 11. The imaging optical system 10 includes a plurality of lenses arrayed along an optical axis 103. The plurality of lenses include a focus lens 102 for adjusting the focus distance of the imaging optical system 10. The focus lens 102 is movable along the optical axis. The focus lens 102 is driven by a control unit 12 in accordance with a defocus amount generated by an image processing unit 14.

The imaging optical system 10 also includes a diaphragm 104 capable of adjusting an F-number (an aperture amount). The F-number of the diaphragm 104 is controlled by the control unit 12 on the basis of a capture condition determined through, for example, automatic exposure control (AE). The diaphragm 104 may also have the functions of a mechanical shutter. An exit pupil 101 is an image of the maximum aperture when the imaging optical system 10 is viewed from the image sensor 11 side; in the figure, the position of the exit pupil 101 is shown.

The image sensor 11 may be, for example, a known CCD or CMOS color image sensor that includes color filters based on the primary-color Bayer array. The image sensor 11 includes a pixel array in which a plurality of pixels are arrayed two-dimensionally, and peripheral circuits for reading out signals from each pixel. Each pixel accumulates charges corresponding to the amount of incident light through photoelectric conversion. A signal with a voltage corresponding to the amount of charges accumulated during an exposure period is read out from each pixel; as a result, a pixel signal group (analog image signals) representing a subject image formed on the image plane by the imaging optical system 10 is obtained.

As will be described later, the pixels included in the image sensor 11 include a plurality of photoelectric conversion regions or photoelectric converters, and are capable of generating a parallax image pair through a single capture session. Then, based on this parallax image pair, automatic focus detection of a phase-difference detection method (phase-detection AF) can be executed, and distance information can be generated. The details will be described later.

The control unit 12 includes one or more processors (hereinafter referred to as a CPU) capable of executing programs. For example, the control unit 12 reads in a program stored in a ROM 21 into a RAM 20, and executes the program through the CPU. The control unit 12 controls the behaviors of each functional block while executing the program, thereby realizing various types of functions of the digital camera 100.

The ROM 21 is, for example, a nonvolatile rewritable memory, and stores programs executable by the CPU of the control unit 12, setting values, GUI data, and so forth. The RAM 20 is used to read in a program executed by the CPU of the control unit 12, and store necessary values during the execution of the program. Furthermore, the RAM 20 is also used as a working memory for the image processing unit 14, a buffer memory for temporarily storing images obtained through image capture, a video memory for a display unit 17, and so forth.

The image processing unit 14 applies predetermined image processing to the analog image signals read out from the image sensor 11, thereby generating signals and image data that suit an intended use, and obtaining and/or generating various types of information. The image processing unit 14 may be, for example, a dedicated hardware circuit designed to realize specific functions, such as an ASIC (Application Specific Integrated Circuit). Alternatively, the image processing unit 14 may be configured to realize specific functions as a result of a processor, such as a DSP (Digital Signal Processor) and a GPU (Graphics Processing Unit), executing software. The image processing unit 14 outputs information and data that have been obtained or generated to the control unit 12, the RAM 20, and the like in accordance with an intended use.

The image processing applied by the image processing unit 14 can include, for example, preprocessing, color interpolation processing, correction processing, detection processing, data editing processing, evaluation value calculation processing, special effects processing, and so forth.

The preprocessing can include A/D conversion, signal amplification, reference level adjustment, defective pixel correction, and so forth.

The color interpolation processing is processing which is executed in a case where the image sensor is provided with color filters, and which interpolates values of color components that are not included in the individual pieces of pixel data composing image data. The color interpolation processing is also called demosaicing processing.

The correction processing can include such processing as white balance adjustment, tone correction, correction of image degradation caused by optical aberration of the imaging optical system 10 (image recovery), correction of the influence of vignetting of the imaging optical system 10, and color correction.

The detection processing can include detection of a characteristic area (a face area, a human body area, or the like) and a motion therein, processing for recognition of a person, and so forth.

The evaluation value calculation processing can include such processing as generation of signals and evaluation values used in automatic focus detection (AF), and generation of evaluation values used in automatic exposure control (AE). In FIG. 1, the function of the image processing unit 14 to generate a defocus amount, which is an evaluation value for AF, is shown as a functional block (a defocus generation unit 141) for the sake of convenience.

The data editing processing can include such processing as cutout of an area (cropping), composition, scaling, encoding and decoding, and generation of header information (generation of a data file). The data editing processing also includes generation of image data for display and image data for recording. Also, generation of distance information based on a defocus amount is also executed as the data editing processing.

The special effects processing can include such processing as addition of blur effects, alteration of shades of colors, relighting, and so forth.

Note that these are examples of processing that can be applied by the image processing unit 14, and are not intended to limit processing applied by the image processing unit 14.

A storage unit 15 is a recording medium for recording a data file storing image data obtained through image capture. The storage unit 15 may be, for example, a combination of a memory card and a reader/writer therefor. The storage unit 15 may be capable of handling a plurality of recording media.

An input unit 16 is a general term for input devices that are provided in the digital camera 100 and operable by a user, such as dials, buttons, switches, a touch panel, and so forth. The control unit 12 monitors an operation on the input unit 16. Upon detection of an operation on the input unit 16, the control unit 12 carries out the function allocated to the operated input device, and the action corresponding to the content of the operation.

The display unit 17 is, for example, a display apparatus, such as a liquid crystal display and organic EL. Continuous execution of video capture and display of the captured video on the display unit 17 allows the display unit 17 to function as an electronic viewfinder (EVF). The action of causing the display unit 17 to function as the electronic viewfinder (EVF) may be referred to as live-view display or through-the-lens display. Also, images displayed on the display unit 17 by way of live-view display or through-the-lens display may be referred to as live-view images or through-the-lens images.

The display unit 17 may be a touch display. In a case where the display unit 17 is a touch display, software keys may be realized by a combination of GUI parts displayed on the display unit 17 and a touch panel. The control unit 12 handles the software keys similarly to the input devices included in the input unit 16.

A communication unit 18 is a communication interface with an external apparatus. The control unit 12 can perform communication conforming with one or more wired or wireless communication standards with an external device via the communication unit 18.

A motion sensor 19 generates signals corresponding to a motion of the digital camera 100. The motion sensor 19 may be, for example, a combination of an acceleration sensor that outputs signals corresponding to motions in the respective axis directions of X, Y, and Z, and a gyroscope that outputs signals corresponding to motions around the respective axes.

<Exemplary Configuration of Image Sensor>

Figure 2A:
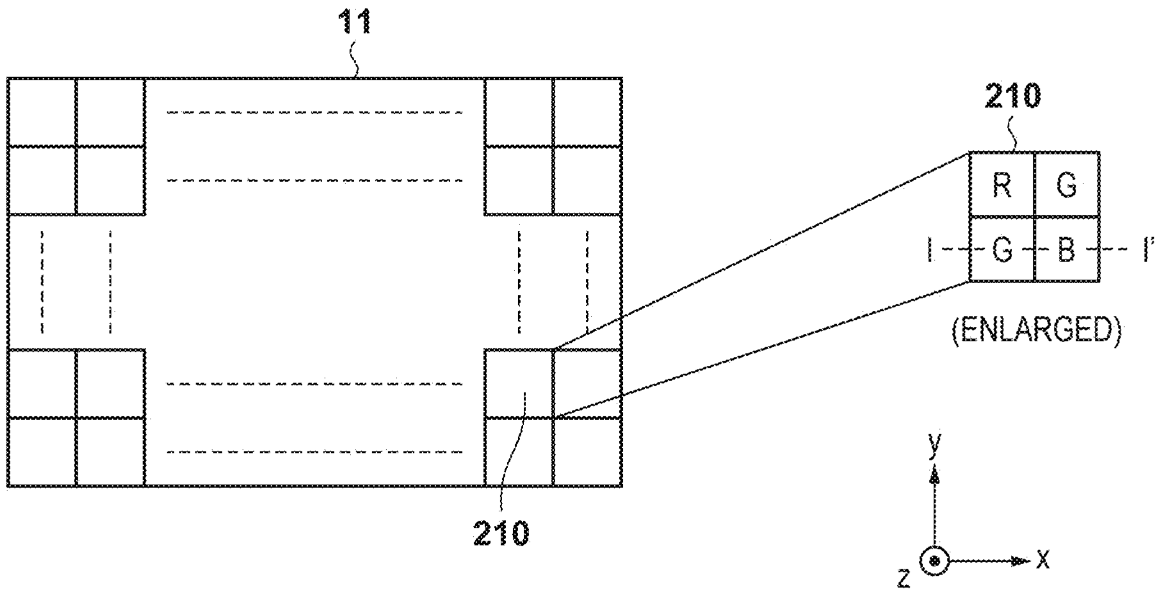
FIG. 2A is a diagram showing an exemplary configuration of an image sensor.

An exemplary configuration of the image sensor 11 will be described with reference to FIG. 2. FIG. 2A is a plan view of the pixel array of the image sensor 11 as viewed from the image plane side. The pixel array is provided with color filters based on the primary-color Bayer array. Therefore, a color filter in one of red (R), green (G), and blue (B) is placed for each pixel in such a manner that the placement is regular based on a repetition unit, which is a pixel group 210 composed of two rows×two columns. Note that an array of color filters other than the primary-color Bayer array may be provided.

Figure 2B:
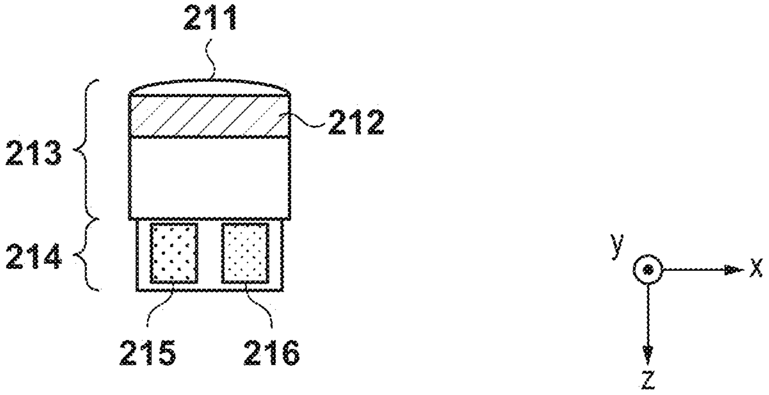
FIG. 2B is a diagram showing an exemplary configuration of the image sensor.

FIG. 2B is a vertical cross-sectional diagram of one pixel. This is equivalent to a configuration along the I-I' cross-section of FIG. 2A. Each pixel includes a light guiding layer 213 and a light receiving layer 214. The light guiding layer 213 includes one microlens 211 and a color filter 212. Also, the light receiving layer 214 includes a first photoelectric conversion unit 215 and a second photoelectric conversion unit 216.

The microlens 211 is configured to efficiently guide a light beam incident on the pixel to the first photoelectric conversion unit 215 and the second photoelectric conversion unit 216. Furthermore, the color filter 212 is one of an R filter, a G filter, and a B filter.

Each of the first photoelectric conversion unit 215 and the second photoelectric conversion unit 216 generates charges corresponding to the amount of incident light. The image sensor 11 can selectively read out a signal from one or both of the first photoelectric conversion unit 215 and the second photoelectric conversion unit 216 in each individual pixel. In the present specification, a signal obtained from the first photoelectric conversion unit 215, a signal obtained from the second photoelectric conversion unit 216, and a signal obtained from both of the first photoelectric conversion unit 215 and the second photoelectric conversion unit 216 may be referred to as an A signal, a B signal, and an A+B signal, respectively.

The exit pupil 101 is viewed by the first photoelectric conversion unit 215 and the second photoelectric conversion unit 216 from different viewpoints. Accordingly, an image composed of A signals and an image composed of B signals that have been read out from the same pixel area compose a parallax image pair. Therefore, by using A signals and α signals, a defocus amount can be calculated in accordance with the principle of phase-detection AF. For this reason, it can be said that each of A signals and B signals is a signal for focus detection.

Meanwhile, as an A+B signal is equivalent to a signal obtained in a case where a pixel includes one photoelectric conversion unit, analog image signals can be obtained by obtaining A+B signals from the respective pixels.

Note that an A signal can also be obtained by subtracting a B signal from an A+B signal. Similarly, a B signal can also be obtained by subtracting an A signal from an A+B signal. Therefore, an A signal, a B signal, and an A+B signal can be obtained by reading out an A+B signal and an A signal or a B signal from each pixel. The type of signals that are read out from the pixels is controlled by the control unit 12.

Note that FIG. 2 shows a configuration in which each pixel includes two photoelectric conversion units 215 and 216 that are aligned in the horizontal direction. However, it is also permissible to adopt a configuration including four photoelectric conversion units, with two aligned in the horizontal direction and two aligned in the vertical direction. Furthermore, it is also permissible to adopt a configuration in which a plurality of pairs of a pixel dedicated to generate an A signal and a pixel dedicated to generate a B signal are dispersedly placed in the pixel array. The image sensor 11 can have any known configuration supporting image-plane phase-detection AF.

<Principle of Image-Plane Phase-Detection AF>

The principle of calculation of a defocus amount with use of A signals and B signals will be described with reference to FIG. 3A to FIG. 3E.

Figure 3A:
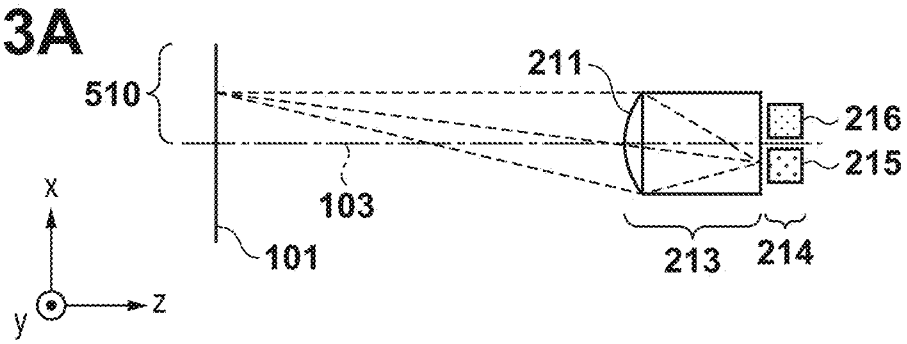
FIG. 3A is a drawing for describing image-plane phase-detection AF.
Figure 3B:
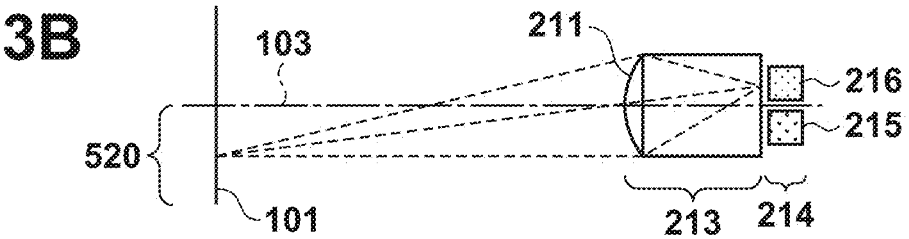
FIG. 3B is a drawing for describing image-plane phase-detection AF.

FIG. 3A is a schematic diagram showing a relationship between the exit pupil 101 of the imaging optical system 10 and a light beam incident on the first photoelectric conversion unit 215 of one certain pixel. FIG. 3B is a schematic diagram showing a relationship between a light beam incident on the second photoelectric conversion unit 216 of the same pixel and the exit pupil 101.

Note that in the present specification, a direction parallel to the optical axis of the imaging optical system is a z direction or a defocus direction, a direction that is perpendicular to the optical axis and parallel to a horizontal direction of the image plane is an x direction, and a direction that is perpendicular to the optical axis and parallel to a vertical direction of the image plane is a y direction.

The microlens 211 is placed so that the exit pupil 101 and the light receiving layer 214 are optically in a conjugate relationship. A light beam that has passed through the exit pupil 101 of the imaging optical system 10 is collected by the microlens 211 and incident on the first photoelectric conversion unit 215 or the second photoelectric conversion unit 216. At this time, as shown in FIG. 3A and FIG. 3B, light beams that have passed through different regions of the exit pupil 101 are mainly incident on the first photoelectric conversion unit 215 and the second photoelectric conversion unit 216, respectively. Specifically, a light beam that has passed through a first pipul region 510 is incident on the first photoelectric conversion unit 215, whereas a light beam that has passed through a second pupil region 520 is incident on the second photoelectric conversion unit 216.

An A signal and a B signal are obtained from each of a plurality of pixels that are aligned in the horizontal direction with a target pixel located at the center. In this case, the amount of a relative positional displacement between an image signal (A image) based on a series of A signals and an image signal (B image) based on a series of B signals (a phase difference or a parallax amount) has a magnitude corresponding to a defocus amount of the target pixel.

In FIG. 3C to FIG. 3E, 511 represents a first light beam that passes through the first pipul region 510, and 521 represents a second light beam that passes through the second pupil region 520.

Figure 3C:
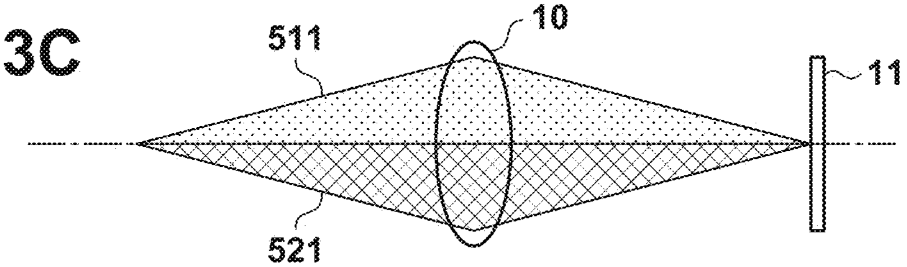
FIG. 3C is a drawing for describing image-plane phase-detection AF.

FIG. 3C shows an in-focus state where the first light beam 511 and the second light beam 521 converge on the image plane. At this time, the phase difference or the parallax amount between the A image and the B image is 0.

Figure 3D:
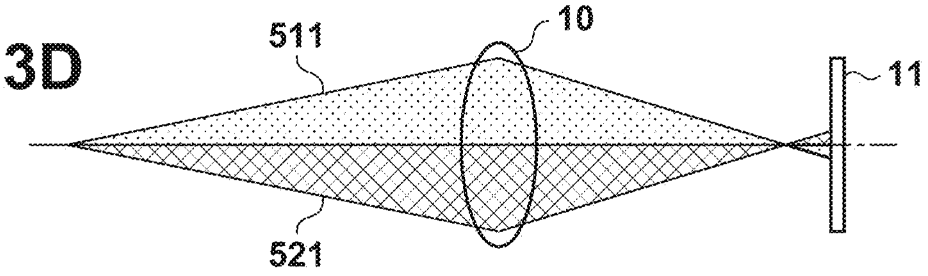
FIG. 3D is a drawing for describing image-plane phase-detection AF.

In FIG. 3D, the first light beam 511 and the second light beam 521 converge on the object side of the image plane (on the negative direction side thereof, along the z axis). At this time, the phase difference or the parallax amount between the A image and the B image has a negative value (<0).

Figure 3E:
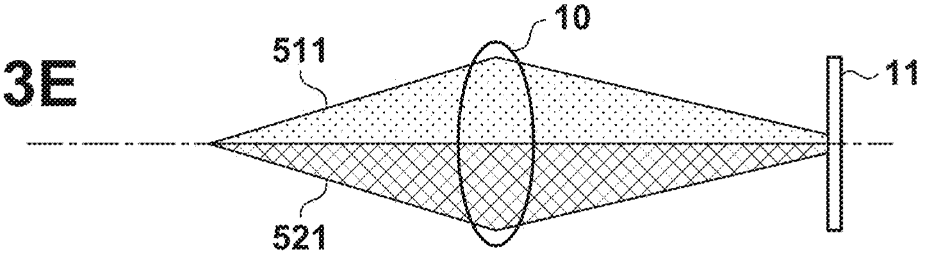
FIG. 3E is a drawing for describing image-plane phase-detection AF.

In FIG. 3E, when viewed from the object side, the first light beam 511 and the second light beam 521 converge beyond the image plane (on the positive direction side thereof, along the z axis). At this time, the phase difference or the parallax amount between the A image and the B image has a positive value (>0).

As described above, a phase difference or a parallax amount between an A image and a B image has a sign corresponding to the relationship between the position on which the first light beam 511 and the second light beam 521 converge and the image plane, and has a magnitude corresponding to a magnitude of a defocus amount. Correlation amounts are calculated by relatively displacing the A image and the B image, and the phase difference or the parallax amount between the A image and the B image can be obtained as a displacement amount corresponding to the maximum correlation amount.

<Processing for Generating Defocus Image>

Figure 4:
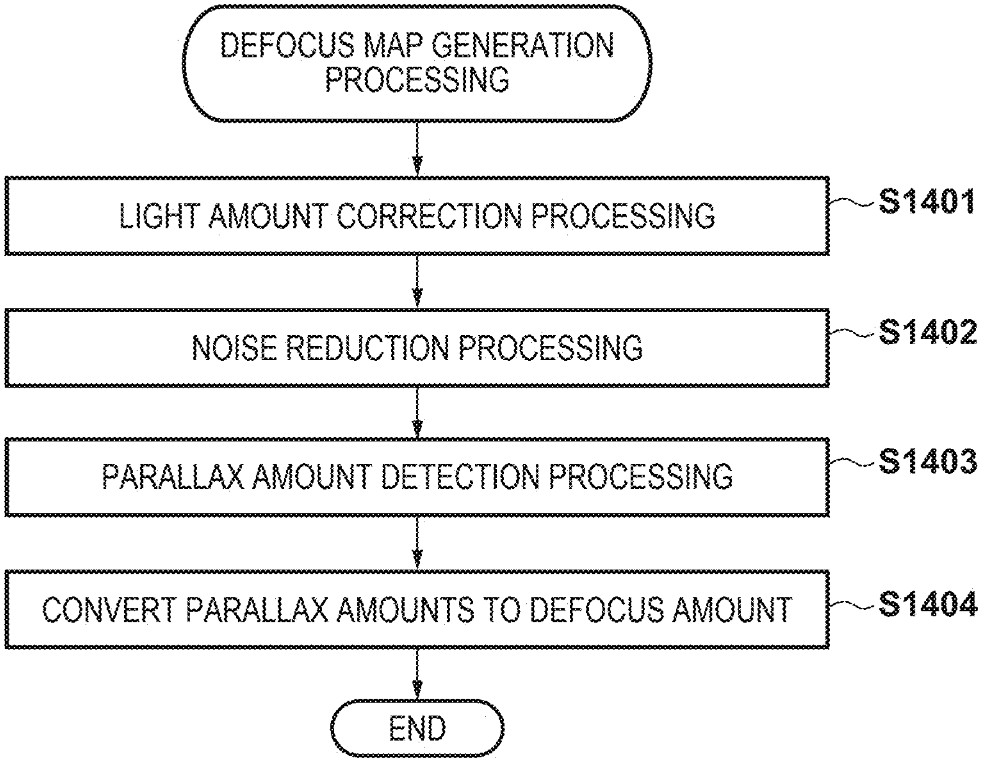
FIG. 4 is a flowchart related to defocus map generation processing according to an embodiment.

Next, an example of processing in which the defocus generation unit 141 of the image processing unit 14 generates a defocus map will be described using a flowchart shown in FIG. 4. The defocus map is two-dimensional data indicating defocus amounts at the respective pixel positions in a captured image.

It is assumed here that an A signal and a B signal of each pixel in the image sensor 11 are stored in the RAM 20.

In S1401, the defocus generation unit 141 corrects the light amounts of A signals and B signals. Especially, regarding a pixel with a large image height, vignetting of the imaging optical system 10 increases a difference between shapes of the first pipul region 510 and the second pupil region 520, and a size difference arises between an A signal and a B signal. The defocus generation unit 141 applies correction values corresponding to the pixel positions to A signals and B signals, thereby correcting the size differences between A signals and B signals. The correction values can be stored in advance in, for example, the ROM 21.

In S1402, the defocus generation unit 141 applies noise reduction processing to A signals and B signals. In general, as a higher spatial frequency causes a relative increase in noise components, the defocus generation unit 141 applies a low-pass filter that decreases in passage rate as the spatial frequency increases to A signals and B signals. Note that, due to a manufacturing error in the imaging optical system 10 or the like, there are cases where a favorable result cannot be obtained through the light amount correction in S1401. For this reason, in S1402, the defocus generation unit 141 can apply a band-pass filter that blocks direct-current components and also has a low passage rate for high-frequency components.

In S1403, the defocus generation unit 141 detects phase differences or parallax amounts between A signals and B signals. The defocus generation unit 141 generates a series of A signals and a series of B signals from, for example, a row of pixels that include a target pixel and are contiguous in the horizontal direction. Then, the defocus generation unit 141 calculates correlation amounts by relatively displacing the series of A signals and the series of B signals. The correlation amounts may be, for example, NCC (Normalized Cross-Correlation), SSD (Sum of Squared Difference), or SAD (Sum of Absolute Difference).

The defocus generation unit 141 calculates a displacement amount corresponding to the maximum correlation between the series of A signals and the series of B signals in a unit smaller than a pixel, and regards the displacement amount as the phase difference or the parallax amount in the pixel of interest. The defocus generation unit 141 detects the phase difference or the parallax amount at each individual pixel position by changing the position of the pixel of interest. Note that the phase difference or the parallax amount between A signals and B signals may be detected using any known method. The resolution at which the phase difference or the parallax amount is calculated may be lower than the resolution of the captured image.

In S1404, the defocus generation unit 141 converts the detected phase difference or parallax amount into a defocus amount. The detected phase difference or parallax amount has a magnitude corresponding to the defocus amount, it can be converted into a defocus amount by applying a predetermined conversion coefficient thereto. Provided that a phase difference or a parallax amount is d and the conversion coefficient is K, a defocus amount ΔL can be obtained using the following formula (1).

$$\Delta L = K \times d \tag{1}$$

The defocus generation unit 141 generates two-dimensional information (a defocus map) that indicates defocus amounts corresponding to the respective pixel positions by converting the detected phase differences or parallax amounts into defocus amounts.

<Obtainment of Distance Information>

Figure 5:
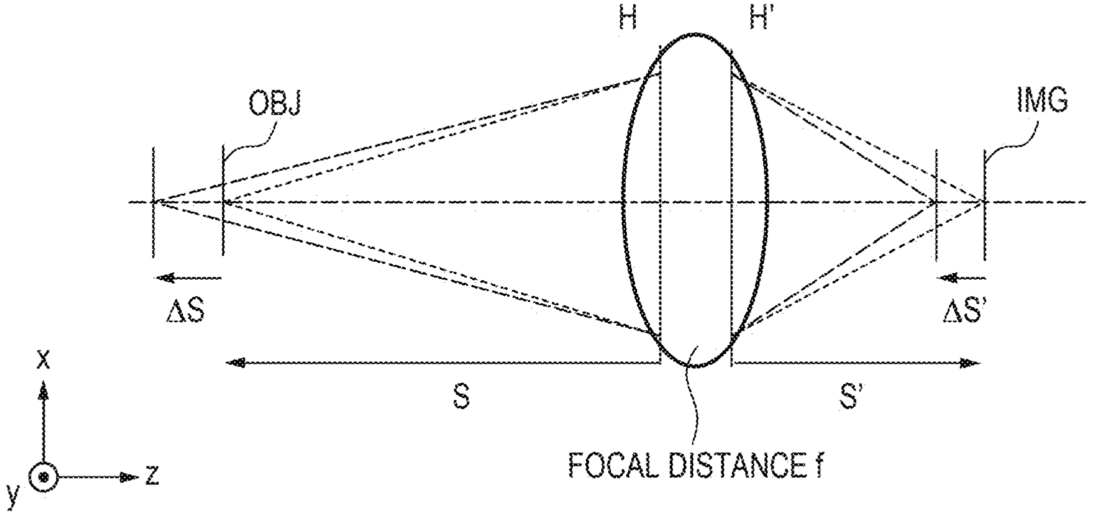
FIG. 5 is a diagram for describing a method of calculating distance information from a defocus amount.

Next, a method of obtaining depth (distance) information on the basis of a defocus amount will be described using FIG. 5. In FIG. 5, OBJ represents an object surface, IMG represents the image plane, H represents a front principal point, H' represents a rear principal point, f represents a focal distance of the imaging optical system (lens), S represents a distance from the object surface to the front principal point, and S' represents a distance from the rear principal point to the image plane. Also, ΔS' represents a defocus amount, and ΔS represents a relative distance on the object side, which corresponds to the defocus amount. A dash-dot line, a dot line, and a dash line are the optical axis, an image forming light beam, and a defocus light beam, respectively.

In image formation of the lens, it is known that the following formula (2) holds.

$$1/S + 1/S' = 1/f \tag{2}$$

Also, in a defocus state, formula (3), which is a modification of formula (2), holds.

$$1/(S + \Delta S) + 1/(S' + \Delta S') = 1/f \tag{3}$$

S and f in an in-focus state can be obtained from information of a capture condition (capture information). Therefore, S' can be calculated from formula (1). Furthermore, the defocus amount ΔS' can be obtained through, for example, automatic focus detection (AF) of a phase-difference detection method or the like. In this way, ΔS can be calculated from formula (3), and the distance S to the object surface OBJ can be calculated.

Using the generated defocus map and capture information, the image processing unit 14 can generate distance information of a subject. The distance information may be, for example, two-dimensional data indicating subject distances corresponding to the respective pixel positions, and may also be referred to as a depth map, a distance image, a depth image, and the like.

Note that although the distance information is obtained using the defocus amount here, the distance information may be obtained using other known methods. For example, a subject distance can be obtained on a per-pixel basis by calculating a focus lens position corresponding to a local minimum of contrast evaluation values on a per-pixel basis. Furthermore, it is also possible to calculate distance information on a per-pixel basis on the basis of a correlation between blur amounts and distances, from image data obtained by capturing the same scene multiple times while changing the focus distance, and from the point spread function (PSF) of the optical system. These techniques are disclosed in, for example, Japanese Patent Laid-Open No. 2010-177741, U.S. Pat. No. 4,965,840, and so forth. Furthermore, in a case where a parallax image pair can be obtained, a subject distance can be obtained on a per-pixel basis with use of a method of stereo matching or the like.

<Generation of Three-Dimensional Data>

Next, an example of a method of generating three-dimensional (3D) data with use of distance information will be described.

First, 3D data is generated by converting the distance information (depth map) into coordinate values of the world coordinate system with use of the focal distance and the focus position obtained from capture information. The obtained 3D data is transformed into polygons so as to be easily handled as a 3D mode. Transformation into polygons can be performed using any known method.

For example, the 3D data can be converted into a polygon mesh by defining surfaces with use of coordinate information of any three adjacent points in the 3D data. Also, from information of a captured image corresponding to three points used in transformation into a polygon, texture information of this polygon can be calculated. Furthermore, filter processing may be applied to the depth map before conversion into coordinate values of the world coordinate system, or to the 3D data before transformation into polygons. For example, small changes in shape may be smoothed by applying a median filter or the like.

In a case where transformation into polygons has been performed, the image processing unit 14 converts polygon data into two-dimensional structured data with use of any known method, so that the data amount can be reduced using a predictive encoding technique for two-dimensional images. Note that transformation into polygons is not indispensable, and the 3D data may be handled in a point cloud format. A method of presenting a three-dimensional shape of an object is arbitrary as long as it has a data format to which a known predictive encoding technique for two-dimensional images can be applied.

Figure 6A:
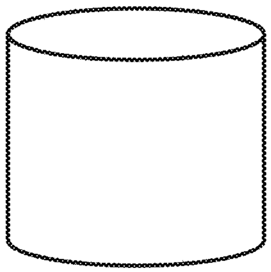
FIG. 6A is a diagram for describing data related to a three-dimensional object, which is generated in an embodiment.
Figure 6B:
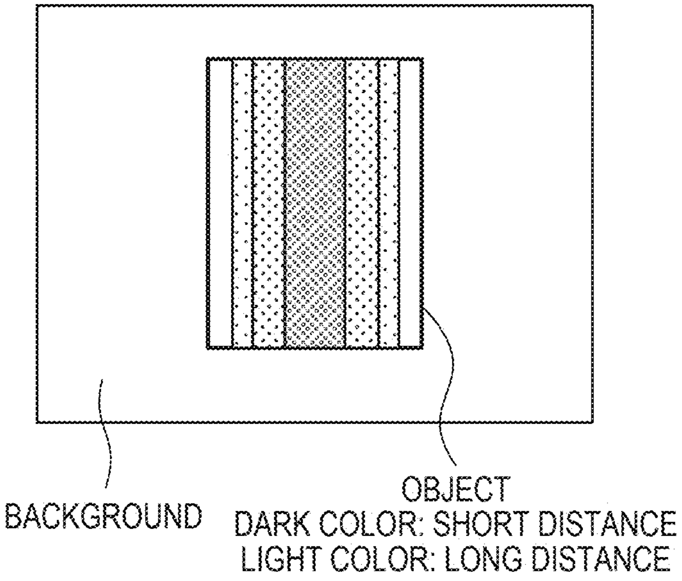
FIG. 6B is a diagram for describing data related to a three-dimensional object, which is generated in an embodiment.
Figure 6C:
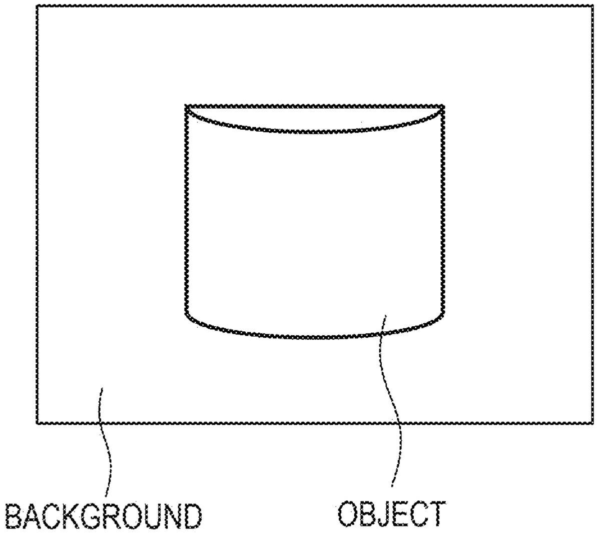
FIG. 6C is a diagram for describing data related to a three-dimensional object, which is generated in an embodiment.

FIG. 6A to FIG. 6C show examples of a 3D object, and a depth map and 3D data thereof.

As the 3D object shown in FIG. 6A, a cylinder is captured from a side surface thereof, and distance information is obtained; as a result, the depth map shown in FIG. 6B is obtained. Here, the gradation in the depth map of FIG. 6B indicates that the lighter the color, the larger (farther) the distance. That is to say, in a captured image, the central portion of the cylinder is located the closest, and the distance increases with an increasing distance from the center toward left and right. FIG. 6C schematically shows a state where 3D data converted from the depth map has been plotted on the world coordinate system. As the depth map is not generated with respect to an area where no 3D object has been captured, the 3D data is also generated only with respect to an area corresponding to the depth map. Although not illustrated, texture information (RGB data) is mapped to the 3D data.

<Relationships between Capture Condition and Accuracy of Distance Information, and Quality of Texture Information>

In a case where distance information is obtained from a captured image, a capture condition can possibly influence the accuracy of the distance information. For example, in a case where distance information is obtained based on a parallax image pair captured using an image sensor supporting image plane phase-difference AF, if the F-number increases, the base-line length of the parallax image pair becomes short, thereby lowering the distance resolution.

Furthermore, regardless of the configuration of the image sensor, if the capture sensitivity (ISO speed) increases, the accuracy of detection of a defocus amount decreases due to amplification of image noise, thereby reducing the accuracy of distance information. Moreover, in a case where an object area accounts for a small percentage of the image (the magnification is low), one pixel corresponds to a larger surface area of an object, thereby lowering the reproducibility of an object shape.

In this way, in a case where distance information is obtained from a captured image, the accuracy of the distance information can possibly change depending on a capture condition. For example, in a case where an image sensor supporting image plane phase-difference AF is used, the closer the F-number is to the maximum aperture value, the longer the base-line length of the parallax image pair becomes, and thus the higher the accuracy of distance information becomes.

On the other hand, the image quality of a captured image is generally higher in a case where the F-number is larger than the maximum aperture value than in a case where the F-number is the maximum aperture value. This is because, when the F-number is the maximum aperture value, vignetting and optical aberration exert the largest influence on the image, and the influence thereof is reduced by increasing the F-number. The higher the image quality of the captured image, the higher the quality of texture information obtained; thus, from the standpoint of the image quality of texture information, it is preferable that the F-number is not the maximum aperture value. As described above, the optimum capture condition varies between the standpoint of accuracy of the distance information and accuracy of 3D data based on the distance information, and the standpoint of image quality of texture information.

This means that, in attempting to reduce the data amount of 3D data and texture information (frame image data) generated on a per-frame basis with use of inter-frame prediction, a key frame optimum for the 3D data is different from a key frame optimum for the texture information. Therefore, in a case where a frame of the same timing is used as a key frame, a data amount reduction that is not optimum for at least one of the 3D data and the texture information can possibly be performed.

<Generation of Three-Dimensional Video File>

The digital camera 100 generates 3D video data and stores the same into the storage unit 15 in a case where, for example, a capture mode for recording a 3D video has been set thereon. Specifically, the control unit 12 controls the behaviors of the image sensor 11 so as to capture a video at a predetermined frame rate, and read out A+B signals and A signals with respect to each frame. It is also possible to read out B signals instead of A signals. Note that the control unit 12 makes an adjustment to exposure conditions and focus on the basis of evaluation values generated by the image processing unit 14, for example, on a per-frame basis.

With respect to each frame, the image processing unit 14 generates frame image data for recording from the A+B signals. The frame image data for recording may be the same as that generated at the time of general video recording. The exposure conditions and the like that were used at the time of image capture are also recorded in association with the frame image data. In a case where a 3D video is recorded, frame image data of a two-dimensional video for recording is used as texture information of 3D data.

Also, with respect to each frame, the image processing unit 14 generates B signals by subtracting the A signals from the A+B signals. Then, the image processing unit 14 (defocus generation unit 141) generates a defocus map from the A signals and the B signals, and further converts the defocus map into a depth map. In a case where the 3D data is transformed into polygon data, the image processing unit 14 converts the depth map into polygon data, and then further converts the polygon data into two-dimensional structured data.

The control unit 12 associates texture information (frame image data) and the 3D data (the two-dimensional structured data or the depth map) that have been generated for the same frame with each other, and stores them into the RAM 20 as frame data of a 3D video. Then, the control unit 12 applies data amount reduction processing (compression processing), which will be described later, to the frame data of the 3D video, and then stores the frame data of the 3D video into the storage unit 15. Note that the frame data of the 3D video may be stored into the storage unit 15 without applying the compression processing thereto, and the compression processing may be applied thereto after the completion of capturing of the 3D video. Furthermore, the frame data of the 3D video may be stored into an external apparatus via the communication unit 18.

<Data Reduction Processing for 3D Video>

Figure 7:
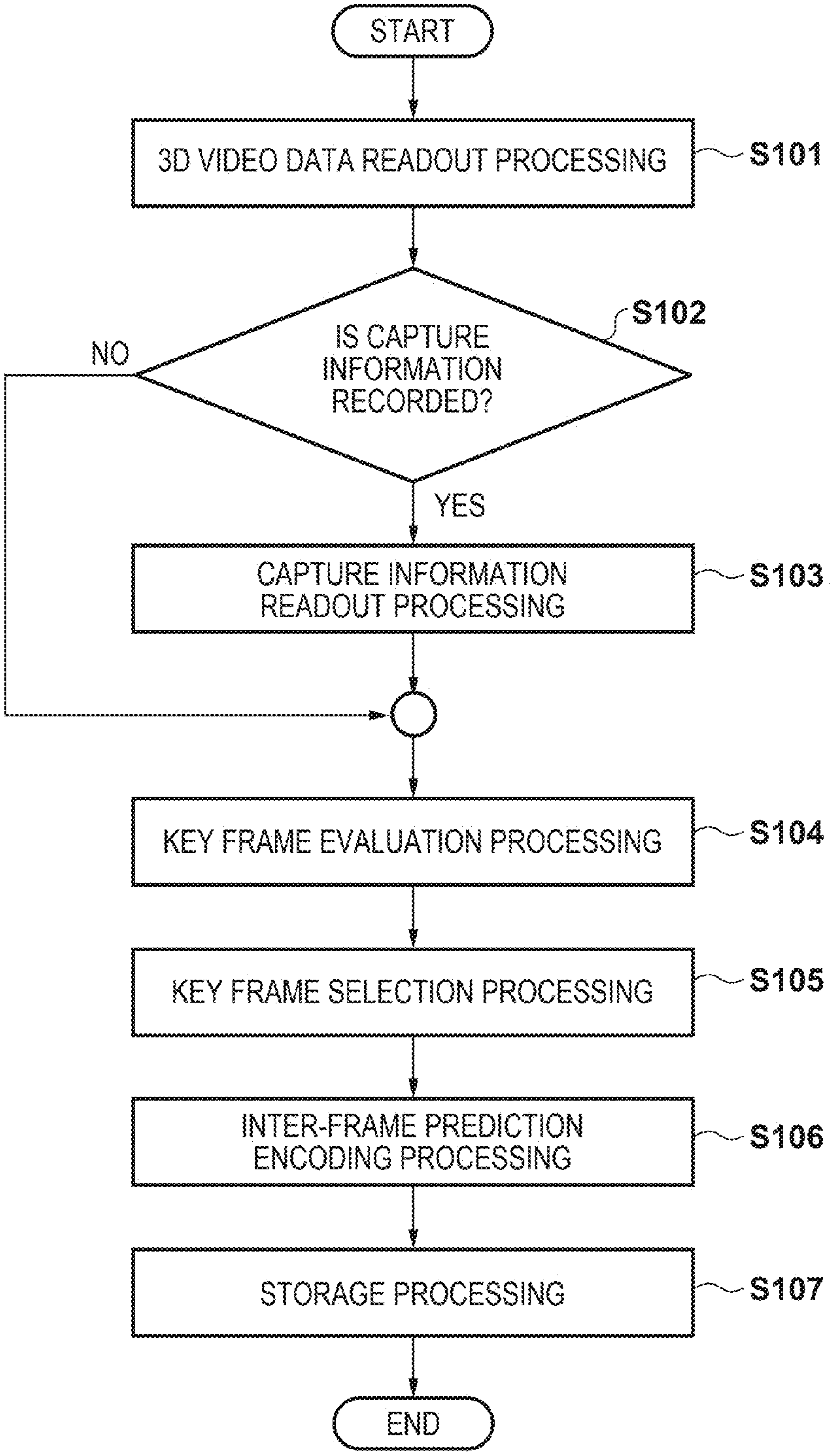
FIG. 7 is a flowchart related to compression processing for three-dimensional video data according to a first embodiment.

Data reduction (compression) processing for a 3D video according to the present embodiment will be described using a flowchart shown in FIG. 7. It is assumed here that the processing is executed by the image processing unit 14 of the digital camera 100 at the time of capturing of the 3D video. However, the processing may be executed by an external apparatus connected via the communication unit 18. Also, the processing may be executed by the image processing unit 14 or the external apparatus after the completion of capturing of the 3D video. It is assumed here that the data amount of 3D video data is reduced using an image encoding technique that utilizes inter-frame prediction, such as MPEG-4.

In S101, the image processing unit 14 reads out three-dimensional video data to be compressed from the storage unit 15 to the RAM 20. It is assumed here that at least frames of one or more GOPs (Groups Of Pictures) are read out. They need not be read out from the storage unit 15 in a case where 3D video data already exists in the RAM 20.

In S102, the image processing unit 14 determines whether capture information pieces have been recorded along with the 3D video data, and executes S103 if it has been determined that the capture information pieces have been recorded, and executes S104 if it has not been thus determined. In a case where capturing has been performed by an image capturing apparatus like the digital camera 100, the capture information pieces are recorded as metadata, for example.

In S103, the image processing unit 14 reads out the capture information pieces of the respective frames read out in S101, and stores them into the RAM 20. The capture information pieces read out here may be, for example, the focal distance, the focus distance, the F-number, the ISO speed, the shutter speed, and the like of the imaging optical system 10.

In S104, the image processing unit 14 executes key frame evaluation processing.

In the key frame evaluation processing, with respect to frame image data of the 3D video read to the RAM 20, the image processing unit 14 evaluates 3D data and texture information on a per-frame basis, and determines whether the frame is appropriate as a key frame (I-frame).

At this time, the image processing unit 14 evaluates the texture information and the 3D data on the basis of different conditions so as to determine a key frame optimum for compression of the texture information and a key frame optimum for compression of the 3D data separately.

Figure 8:
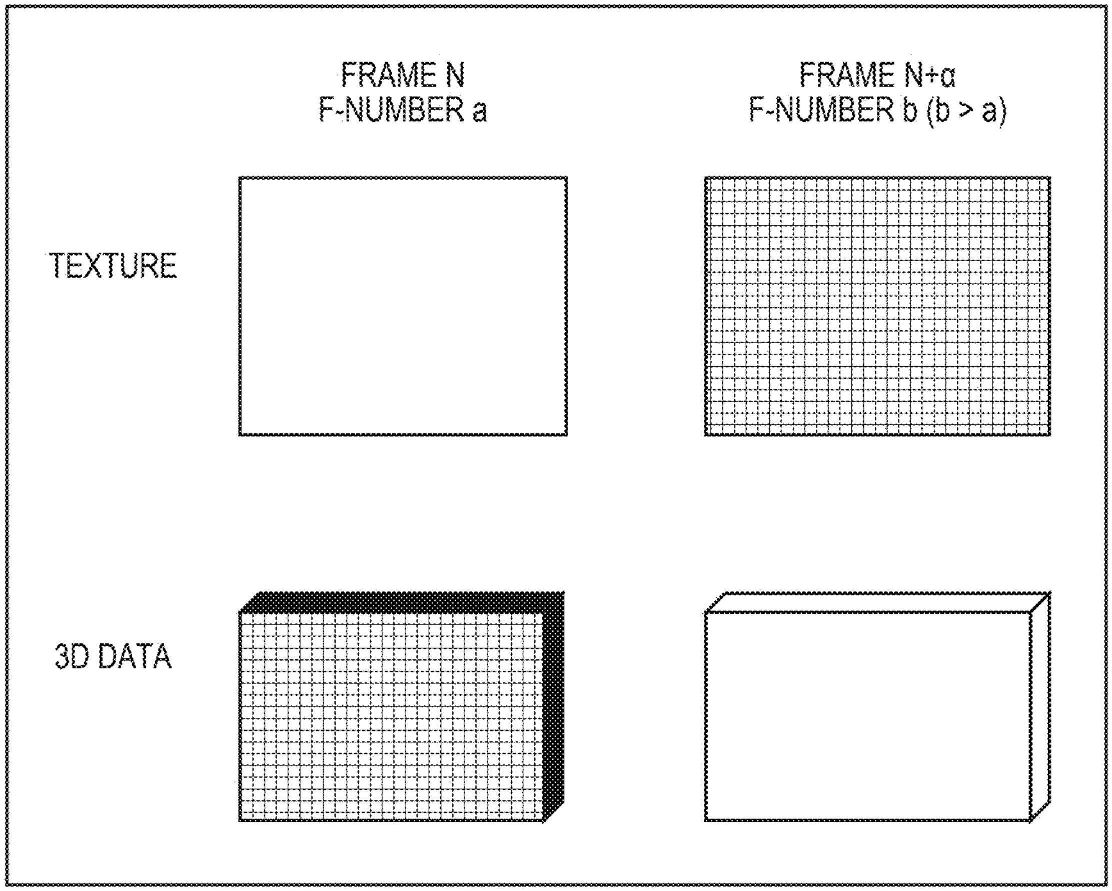
FIG. 8 is a diagram for describing a key frame evaluation method according to the first embodiment.

FIG. 8 is a diagram schematically showing texture information and 3D data of a corresponding frame. The left column and the right column show frame N and frame N+$\alpha$ ($\alpha \geq 1$), respectively. Frame N has been captured with an F-number of a, whereas frame N+a has been captured with an F-number of b (b>a). As frame N has been captured with the F-number closer to the maximum aperture, the image quality of the texture information (frame image data) is higher for frame N+$\alpha$. On the other hand, as frame N has a longer base-line length, the distance resolution of the 3D data is higher for frame N.

In the key frame evaluation processing, the image processing unit 14 can make the determination on the basis of, for example, the F-numbers at the time of capturing of all frames included in the GOP. For example, the image processing unit 14 can determine a frame with the largest F-number at the time of capturing as a key frame optimum for the texture information, and determine a frame with the smallest F-number at the time of capturing as a key frame optimum for the 3D data.

Note that it is possible to calculate, on a per-frame basis, an evaluation value based on one or more of a plurality of capture condition items, and determine a frame with the largest evaluation value as an optimum key frame. In this case, the relationship between a capture condition item and an evaluation value can be as follows, for example.

F-Number

As stated earlier, the smaller the F-number, the higher the distance resolution of the 3D data, and the lower the resolution of the texture information. Therefore, an evaluation value related to the 3D data can be set larger, and an evaluation value related to the texture information can be set smaller, for a smaller F-number. However, if the F-number exceeds a threshold, the image contrast decreases under the influence of diffraction. In view of this, provided that a first F-number<a second F-number<a third F-number (threshold), the evaluation value related to the texture information increases with an increase in the F-number until the F-number reaches the third F-number from the first F-number, and decreases after the F-number exceeds the third F-number. The evaluation value for a case where the F-number exceeds the third F-number may be a fixed value, or may decrease in a stepwise manner.

Shutter Speed

When the shutter speed is slow, a camera shake and a moving object blur easily occur. Therefore, both of the evaluation values related to the 3D data and the texture information are made smaller when the shutter speed is slower than a threshold than when the shutter speed is faster than the threshold. In a case where the focal distance of the imaging optical system 10 is variable, the threshold may decrease with an increase in the focal distance.

ISO Speed

When the ISO speed is high, image noise increases. As a result, the reliability of the 3D data decreases. Therefore, both of the evaluation values related to the 3D data and the texture information are made smaller when the ISO speed is equal to or higher than a threshold than when the ISO speed is faster than the threshold.

Magnification (Combination of Focal Distance and Focus Distance)

When the magnification is low, the distance resolution of the 3D data decreases. Furthermore, the resolution of the texture information decreases as well. Therefore, both of the evaluation values related to the 3D data and the texture information are made smaller when the magnification is equal to or lower than a threshold than when the magnification is higher than the threshold. The magnification can be prepared in advance in accordance with, for example, a combination of the focal distance and the focus distance of the imaging optical system 10. Alternatively, the percentage that an area of a main subject accounts for in a screen and the magnification may be associated with each other.

For example, in the case of a 3D video of a scene where the main subject approaches the digital camera 100 or a scene where the main subject moves away therefrom, both of the evaluation values related to the 3D data and the texture information are made larger for a higher magnification, and for a shorter focus distance.

Note that whether a frame is appropriate as a key frame may be evaluated based on a condition other than the capture information pieces. For example, with regard to the texture information (frame image data), the evaluation of a frame as a key frame may be made separately for an appropriately exposed area and a dark area. Specifically, among the plurality of frames to be evaluated, a frame with a dark area in which exposure is closest to the appropriate exposure is set as a frame with the largest evaluation value for the dark area. Bright areas can also be evaluated separately in a similar manner.

An evaluation value may take two values, such as OK/NG (or I/O), or may take three or more values. Alternatively, an evaluation value may be a value corresponding to a rank within the frames to be evaluated. The image processing unit 14 stores the evaluation values into the RAM 20 in association with the frames that have been evaluated.

In S105, based on the result of the evaluation processing of S104, the image processing unit 14 selects a key frame for the 3D data and a key frame for the texture information. The image processing unit 14 can select, for example, a frame with the largest evaluation value as a key frame. In a case where a plurality of evaluation values exist for each frame, a frame with the largest sum of evaluation values can be selected as a key frame. Note that a key frame may also be selected based on other conditions. Furthermore, a key frame may be selected from among frames with evaluation values that are not NG. The same goes for a case where a key frame for the texture information is selected on a per-area basis.

In S106, the image processing unit 14 encodes the 3D data and the texture information separately, on a per-GOP basis, by performing MPEG encoding while using the key frames selected in S105 as I-frames. The MPEG encoding method, which assigns I-frames, P-frames, and B-frames on a per-GOP basis and performs inter-frame prediction encoding with respect to the P-frames and the B-frames, is known, and therefore a detailed description thereof is omitted. Note that MPEG encoding may be performed by assigning I-frames and P-frames without B-frames.

The image processing unit 14 encodes the 3D video data by repeatedly executing processing of S101 to S106 as necessary.

In S107, the image processing unit 14 sequentially records 3D video data files, which store the 3D video data including the encoded 3D data and texture information, in the storage unit 15.

Note that in a case where the 3D video data has been read out from the storage unit 15 in S101, the 3D video data may be replaced with the encoded 3D video data, or the 3D video data before encoding may be reserved. Furthermore, the 3D video data files storing the encoded 3D video data may be transmitted to an external apparatus via the communication unit 18.

Here, the external apparatus includes a decoder supporting the encoding method that was used in encoding of the 3D data and the texture information in S106. The decoder decodes the 3D data and the texture information of the 3D video data stored in the 3D video data files separately, by referring to the key frames that have been respectively set therefor. Then, the external apparatus generates a combination of the decoded 3D data and texture information on a per-frame basis, deploys each frame to a memory, and displays and reproduces the frames by reading out the frames in line with the chronology of the frames. In this way, the video can be reproduced and displayed while providing the stereoscopic effects to 3D objects that are included in images as subjects. Note that after the 3D data and the texture information have been decoded, a combination of the 3D data and the texture information may be generated on a per-frame basis and stored into a storage apparatus of the external apparatus as files.

According to the present embodiment, when encoding 3D video data that includes 3D data and texture information on a per-frame basis with use of inter-frame prediction, a key frame for the 3D data and a key frame for the texture information are determined separately. In this way, the 3D data and the texture information can be encoded using optimum key frames, and the data amount can be efficiently reduced while suppressing a reduction in the image quality caused by the encoding.

Second Embodiment

Next, a second embodiment of the disclosure will be described. The present embodiment may be similar to the first embodiment, except for the compression processing for 3D video data. Therefore, the following describes the compression processing.

Figure 9:
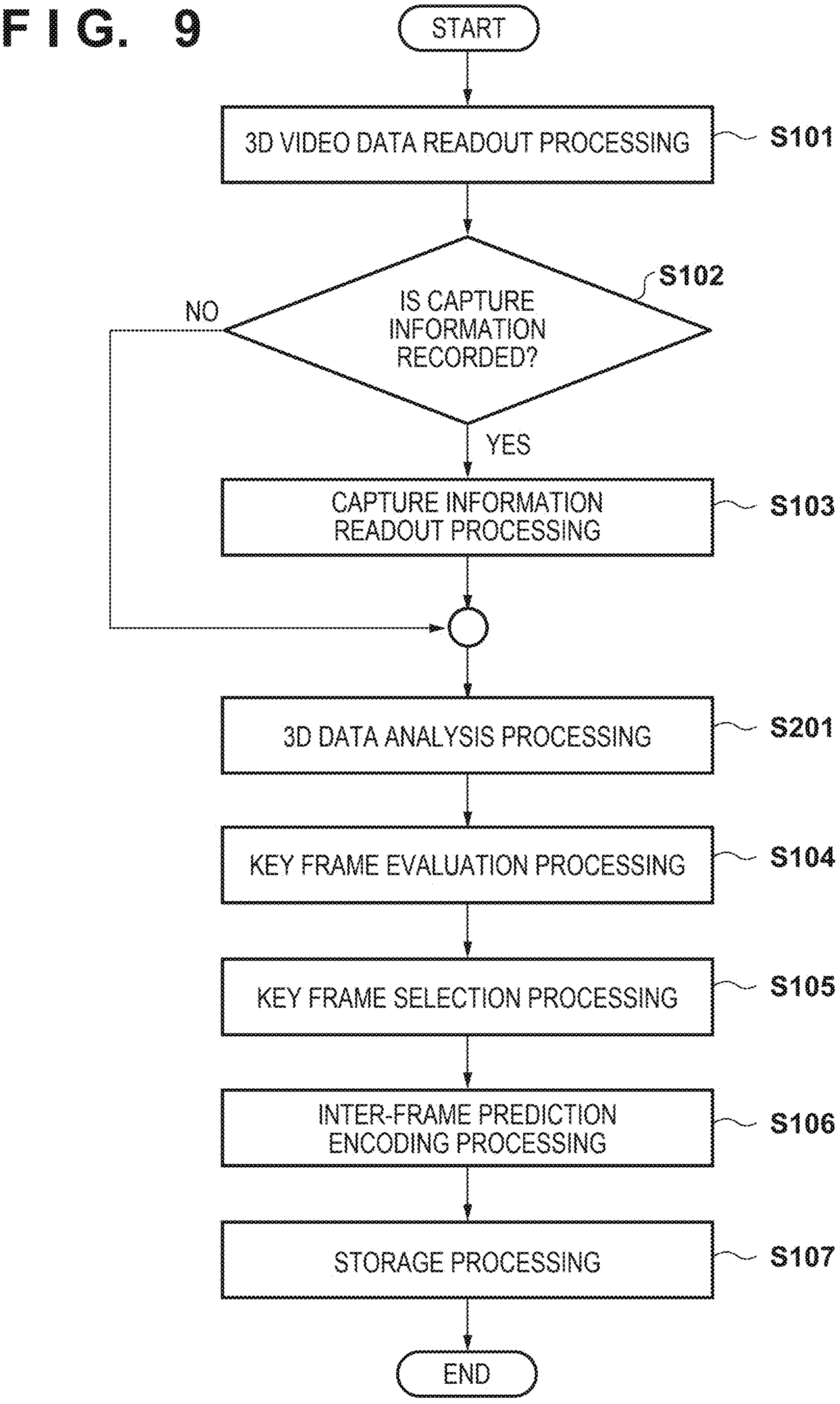
FIG. 9 is a flowchart related to compression processing for three-dimensional video data according to a second embodiment.

FIG. 9 is a flowchart related to the compression processing for 3D video data according to the present embodiment. Steps that execute processing similar to that of the first embodiment are given the same reference numerals as in FIG. 7. The present embodiment includes a step S201 of executing 3D data analysis processing before the key frame evaluation processing of S104.

The 3D data analysis processing is executed to evaluate and select key frames more appropriately. In a case where 3D data is generated from parallax images, it is rarely the case that the entirety of the parallax images is included in the depth of field, and a blurred area is generally included. As an area with a high degree of focus has higher contrast than an area with a low degree of focus, and the distance resolution thereof becomes high in obtained 3D data.

During capturing of a video, the focus distance can change with time, and accordingly, an area with a high degree of focus in the parallax images can also change with time. Therefore, regarding 3D data as well, it is possible to select 3D data with a high distance resolution as a key frame on a per-area basis. 3D data may be divided in the distance direction, or may be divided in the distance and vertical directions. Pre-division 3D data may be one continuous object, or may be a plurality of objects.

Figure 10:
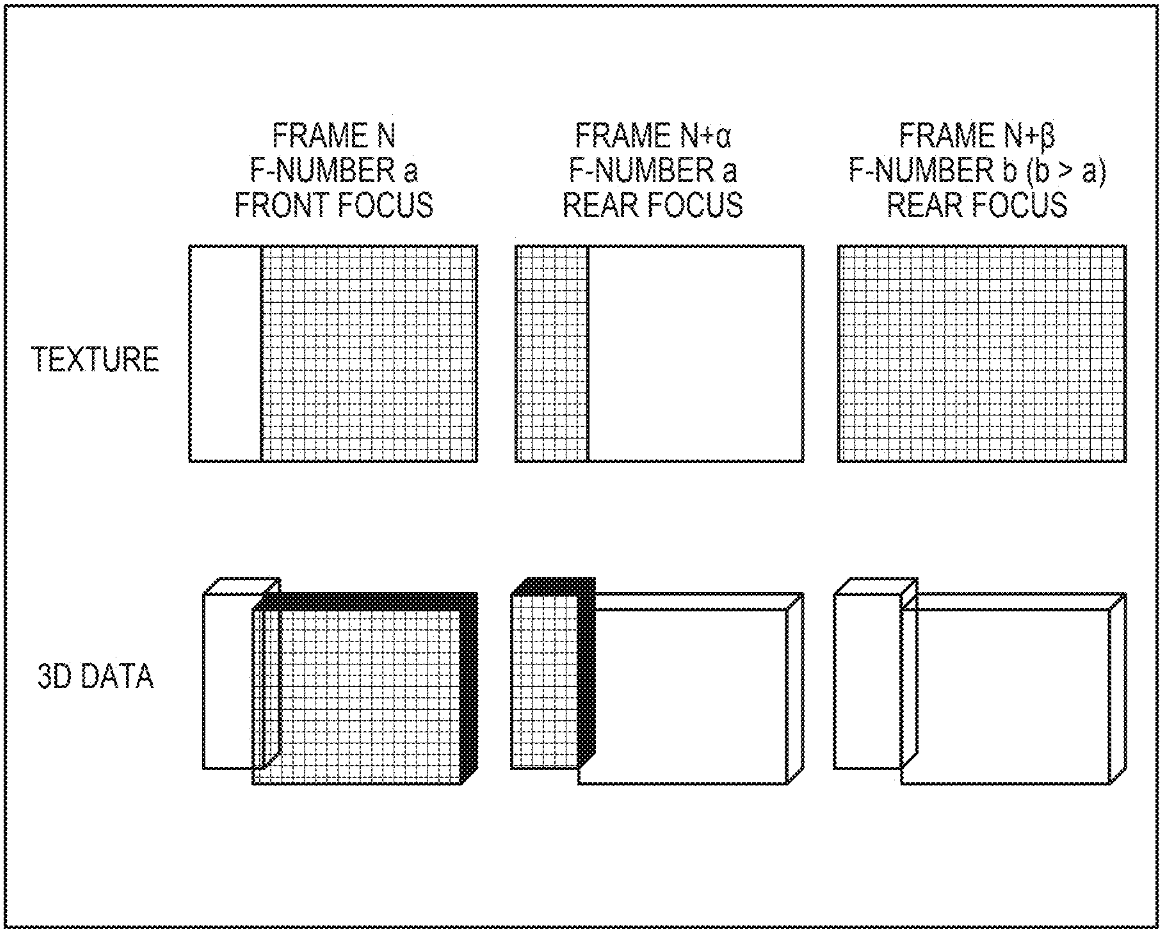
FIG. 10 is a diagram for describing a key frame evaluation method according to the second embodiment.

FIG. 10 is a diagram schematically showing texture information and 3D data of a corresponding frame. The left column, the center column, and the right column show frame N, frame N+$\alpha$ ($\alpha \geq 1$), and frame N+$\beta$ ($\beta$>a), respectively.

Frame N and frame N+$\alpha$ have been captured with an F-number of a, whereas frame N+$\beta$ has been captured with an F-number of b (b>a). Also, the focus is in front of an object in frame N, and the focus is behind the object in frame N+$\alpha$. Furthermore, frame N+$\beta$ shows a state where, as the F-number has increased from the state of frame N+$\alpha$, the entire texture information has been brought into focus.

Regarding 3D data, an area with a high distance resolution is indicated by a grid-like pattern. In frame N, the distance resolution is high in front of the object, whereas in frame N+$\alpha$, the distance resolution is high behind the object. In frame N+$\beta$, due to the increase in the F-number, the distance resolution has decreased behind the object, and there is no longer an area with a high distance resolution.

In the 3D data analysis processing, the image processing unit 14 divides 3D data into a front side and a rear side, and increases an evaluation value of frame N with respect to the front side, and an evaluation value of frame N+$\alpha$ with respect to the rear side. Furthermore, regarding the texture information, an evaluation value of frame N+$\beta$ is increased.

The image processing unit 14 stores information on how the 3D data has been divided, evaluation values of the respective divided areas of the 3D data, and the evaluation values related to the texture information into the RAM 20. These information and evaluation values are taken into consideration in key frame selection processing of S105, together with the evaluation values determined in the key frame evaluation processing of S104.

Note that in the key frame evaluation processing of S104, evaluation values may not be calculated with respect to the 3D data. Alternatively, it is possible to calculate only the evaluation values related to items that are not taken into consideration in the 3D data analysis processing. The same goes for evaluation values of the texture information.

In S105, the image processing unit 14 selects a key frame for the 3D data on a per-divided area basis. A key frame for the texture information can be selected similarly to the first embodiment.

In S106, the image processing unit 14 executes processing similarly to the first embodiment, except that the 3D data is encoded on a per-divided area basis.

According to the present embodiment, it is possible to make a finer selection of key frames with respect to the 3D data, and the data amount can be effectively reduced while further suppressing a reduction in the image quality of the 3D data.

Note that the encoded 3D video data generated in the first and second embodiments can be decoded using a known method. The decoded 3D data is converted into a polygon mesh. Furthermore, based on the decoded texture information, the texture can be mapped to a 3D model that is based on the polygon mesh.

The present disclosure can provide an image processing apparatus and an image processing method capable of appropriately reducing a data amount of a 3D video by making use of the correlation between frames.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ΔSIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the disclosure is not limited to the disclosed exemplary embodiments. The scope of the following claims is to be accorded the broadest interpretation so as to encompass all such modifications and equivalent structures and functions.

The invention claimed is:

1. An image processing apparatus comprising:

one or more processors that execute a program stored in a memory and thereby function as a plurality of units comprising: (1) an obtaining unit configured to obtain 3D video data each frame of which includes 3D data and texture information; and (2) an encoding unit configured to encode the 3D video data with use of inter-frame prediction, wherein the encoding unit (1) performs inter-frame prediction encoding of the 3D data and inter-frame prediction encoding of the texture information separately, and (2) based on evaluation values related to the 3D data and the texture information, selects a key frame for performing the inter-frame prediction encoding of the 3D data, and a key frame for performing the inter-frame prediction encoding of the texture information, separately, wherein the evaluation values are based on capture information of frames, the capture information including an F-number at a time of image capture, wherein the evaluation value related to the 3D data is larger when the capture information is a first F-number than when the capture information is a second F-number larger than the first F-number, and wherein the evaluation value related to the texture information is larger when the capture information is the second F-number than when the capture information is the first F-number.

2. The image processing apparatus according to claim 1, wherein the encoding unit calculates the evaluation values related to the 3D data and the texture information on a per-frame basis, and selects frames with the largest evaluation values as the key frames.

3. The image processing apparatus according to claim 1, wherein the capture information further includes one or more of a shutter speed, an ISO speed, a focus distance, and a focal distance of an imaging optical system, at a time of image capture.

4. The image processing apparatus according to claim 1, wherein the evaluation value related to the texture information decrease when the capture information exceeds a third F-number larger than the second F-number.

5. The image processing apparatus according to claim 1, wherein the texture information is a frame image of a 2D video, and wherein the encoding unit selects the key frame for encoding the texture information per area in the frame image.

6. The image processing apparatus according to claim 1, wherein the encoding unit divides the 3D data into a plurality of areas, and selects the key frame for encoding the 3D data per area in the 3D data.

7. The image processing apparatus according to claim 6, wherein the encoding unit divides the 3D data in one or more of a depth direction, a horizontal direction, and a vertical direction.

8. The image processing apparatus according to claim 1, wherein the 3D data is polygon data, and wherein the encoding unit performs the inter-frame prediction encoding after converting the polygon data into two-dimensional structured data.

9. The image processing apparatus according to claim 1, wherein in performing the inter-frame prediction encoding, the encoding unit uses the key frames as I-frames, and other frames as P-frames or B-frames.

10. An image processing method comprising:

obtaining 3D video data each frame of which includes 3D data and texture information; and encoding the 3D video data with use of inter-frame prediction, wherein the encoding includes (1) performing inter-frame prediction encoding of the 3D data and performing inter-frame prediction encoding of the texture information separately, and (2) selecting, based on evaluation values related to the 3D data and the texture information, a key frame for performing the inter-frame prediction encoding of the 3D data, and a key frame for performing the inter-frame prediction encoding of the texture information, separately, wherein the evaluation values are based on capture information of frames, the capture information including an F-number at a time of image capture, wherein the evaluation value related to the 3D data is larger when the capture information is a first F-number than when the capture information is a second F-number larger than the first F-number, and wherein the evaluation value related to the texture information is larger when the capture information is the second F-number than when the capture information is the first F-number.

11. A non-transitory computer-readable medium storing a program for causing a computer to perform an image processing method, the image processing method comprising:

obtaining 3D video data each frame of which includes 3D data and texture information; and encoding the 3D video data with use of inter-frame prediction, wherein the encoding includes (1) performing inter-frame prediction encoding of the 3D data and performing inter-frame prediction encoding of the texture information separately, and (2) selecting, based on evaluation values related to the 3D data and the texture information, a key frame for performing the inter-frame prediction encoding of the 3D data, and a key frame for performing the inter-frame prediction encoding of the texture information, separately, wherein the evaluation values are based on capture information of frames, the capture information including an F-number at a time of image capture, wherein the evaluation value related to the 3D data is larger when the capture information is a first F-number than when the capture information is a second F-number larger than the first F-number, and wherein the evaluation value related to the texture information is larger when the capture information is the second F-number than when the capture information is the first F-number.

* * * * *